July 12, 1960  W. A. MAYS  2,944,697
HIGH PRESSURE BOMB
Filed July 2, 1958
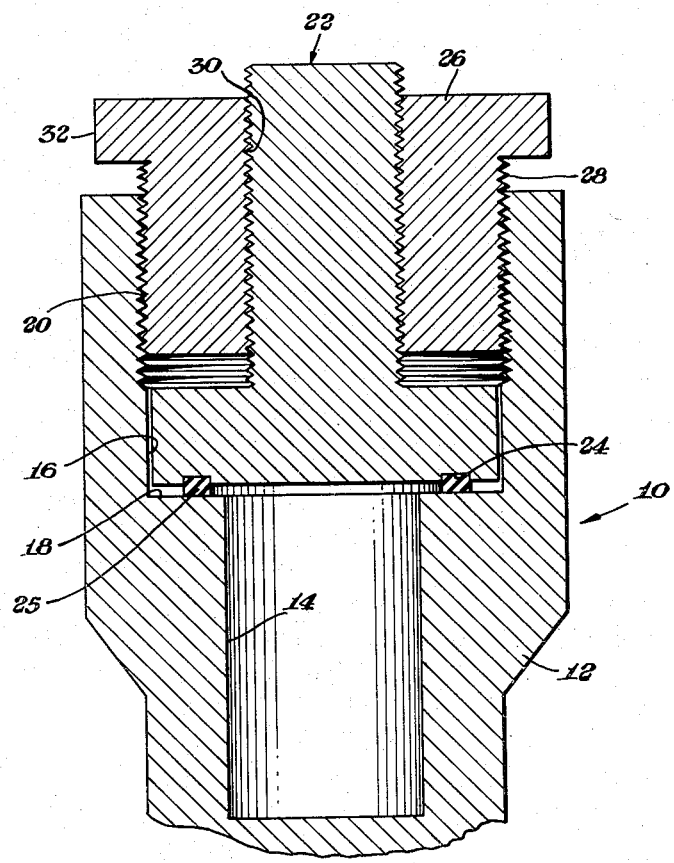
INVENTOR.
William A. Mays
BY
Earl D. Ayers
AGENT 2,944,697
Patented July 12, 1960

2,944,697
HIGH PRESSURE BOMB

William A. Mays, Freeport, Tex., assignor to The Dow Chemical Company, Midland, Mich., a corporation of Delaware Filed July 2, 1958, Ser. No. 746,156

6 Claims. (Cl. 220—39)

This invention relates to high pressure bombs for use in carrying out chemical reactions, and particularly to closure means for such bombs.

Many chemical reactions are best carried out under conditions of high temperature and pressure with the reacting materials disposed in a sealed container usually referred to as a "bomb."

High pressure bombs are available with closures of varying types such as a Bridgman, modified Bridgman or Bonnet closure. While these closures are satisfactory, care is required with some closures to get an even sealing pressure and in others the sealing gasket becomes easily scarred.

Accordingly, a principal object of this invention is to provide an improved high pressure bomb.

Another object of this invention is to provide an improved high pressure bomb closure in which pressure is applied uniformly against the sealing gasket and movement of the gasket, while it is under pressure, is eliminated.

In accordance with this invention there is provied a bomb enclosure having side walls, a closed end and an open end. The open end has a circular bore which terminates in a gasket receiving bearing surface. A closure head of inverted T shaped longitudinal axial cross sectional configuration fits in the open end, bearing against the gasket. The "shank" of the closure head is threaded. A nut having an axial bore has threads on its outer surface to match threads on the bore of the open end and threads on its bore wall to match the threads on the closure head. The two sets of threads are of different pitch but turn in the same direction to permit a tight, high pressure seal of closure head against the gasket due to the differential thread arrangement.

The invention, as well as additional objects and advantages thereof, will best be understood when the following detailed description is read in connection with the accompanying drawing in which the single figure shows, in section, a high pressure bomb made in accordance with this invention.

In the figure the high pressure bomb, indicated generally by the numeral 10, comprises a body 12 which has a bore 14 and counter bore 16 extending inwardly from one end. A flat bearing surface 18 extends from the upper end of the bore 14 to the lower end of the counter bore 16. The wall of the bore 16 has threads 20 from the upper end of the counter bore to a point more than half way to the bottom of the counter bore.

A closure head, indicated generally by the numeral 22, and having a flat bottom surface except for an annular gasket retaining groove 24 is disposed within the counter bore 16. The closure head is of inverted T shaped longitudinal axial cross sectional configuration and comprises a lower cylindrical part and a coaxially disposed upper part which is integral (but not necessarily so) with the lower part. The diameter of the lower cylindrical part exceeds the diameter of the bore 14 by at least twice the width of the gasket 25.

An externally threaded nut 26 whose threads 28 match the threads of the counter bore 16 has an axially disposed threaded bore 30 extending therethrough. The diameter of the threaded bore 30 corresponds to that of the upper part of the closure head 22. The threads on the upper part of the closure head 22 match the threads of the bore 30.

In operation, with the nut 26 screwed into the counter bore as shown in the drawing, the nut 26 is tightened (by means of a wrench, for example, engaging the head 32 of the nut 26, for example). After the closure head 22 and gasket come into contact with the bearing surface 18 the gasket 25 and head 22 cease to rotate. Continued rotation of the nut 26, due to the differential thread arrangement between the threads 28 and the threads on the bore 30, causes a large mechanical advantage to be obtained because the coarse thread 28 advances the fine thread (on head 22) a little more per revolution than the head 22 is unscrewed. By such an arrangement the axial thrust required to seal the gasket is easily obtainable.

In one high pressure bomb made in accordance with this invention the coarse to fine thread ratio was 12/13 (that is 12 threads per inch on the threads 28 and 13 threads per inch on the closure head 22). Both sets of threads are right handed, but, alternatively, both sets of threads could be left handed.

As explained above, once the gasket 25 comes into contact with the bearing surface 18 the closure head no longer turns and there is no chance of scarring the gasket or gasket bearing surfaces.

The value of the ratio of the threads should have a value less than 1.0 and not less than .4 and is preferably from a value of less than 1.0 and not less than .7. The 12/13 thread ratio cited above, for example, has a value of .923. The value of the ratio of the threads, not the number of threads per inch, is important. It should be remembered that too many threads per inch will not be structurally strong enough at very high pressures.

What is claimed is:

1. A high pressure bomb comprising a body, said body having a bore extending inwardly from a surface thereof and part way through said body, a counterbore coaxial with said bore, said counterbore having a threaded wall, a bearing surface between said bore and said counter bore, a closure head having a closed ended cylindrical lower part of larger diameter than said bore and smaller diameter than said counter bore and a threaded cylindrical upper part of smaller diameter than the lower part which is coaxial with the lower part, a gasket, said gasket being disposed between said lower part of the closure head and said bearing surface, and a nut having a threaded cylindrical outer wall part and a threaded coaxial bore extending therethrough, the cylindrical outer wall part of said nut being substantially equal in diameter to the diameter of said counter bore and threaded as is said counter bore, the bore of said nut being of substantially the same diameter as the diameter of the upper part of the closure head and threaded as is said upper part of the closure head, the threads of the counter bore and of the cylindrical surface of the nut being coarser than the threads of the upper part of the closure head and of the bore threads in the nut, all the threads turning in the same direction.

2. A high pressure bomb in accordance with claim 1, wherein said bearing surface is perpendicular to the longitudinal axis of said bore and counter bore in the bomb body.

3. A high pressure bomb in accordance with claim 1, wherein the turns ratio of the coarser threads to the finer threads is less than 1.0 and at least .4.

4. A high pressure bomb in accordance with claim 1, wherein the turns ratio of the coarse threads to the fine threads is less than 1.0 and more than .7.

5. A high pressure bomb in accordance with claim 1, wherein said gasket is held in a groove in the lower part of the said closure head.

6. A high pressure bomb in accordance with claim 1, wherein the diameter of the lower part of said closure head exceeds the diameter of the bore in the body by at least twice the cross sectional diameter of the gasket.

References Cited in the file of this patent

UNITED STATES PATENTS

| | | |
|---|---|---|
| 980,860 | Bartlett et al. | Jan. 3, 1911 |
| 2,070,084 | Key | Feb. 9, 1937 |
| 2,092,135 | Parker | Sept. 7, 1937 |
| 2,485,280 | Grace | Oct. 18, 1949 |